(12) United States Patent
Adams et al.

(10) Patent No.: US 9,275,210 B2
(45) Date of Patent: Mar. 1, 2016

(54) SYSTEM AND METHOD OF ENHANCING SECURITY OF A WIRELESS DEVICE THROUGH USAGE PATTERN DETECTION

(71) Applicant: Blackberry Limited, Waterloo (CA)

(72) Inventors: Neil Patrick Adams, Waterloo (CA); Marek Krzeminski, Waterloo (CA)

(73) Assignee: BLACKBERRY LIMITED, Waterloo (CA)

( * ) Notice: Subject to any disclaimer, the term of this patent is extended or adjusted under 35 U.S.C. 154(b) by 108 days.

(21) Appl. No.: 13/793,613

(22) Filed: Mar. 11, 2013

(65) Prior Publication Data
US 2014/0215550 A1   Jul. 31, 2014

Related U.S. Application Data

(60) Provisional application No. 61/758,139, filed on Jan. 29, 2013.

(51) Int. Cl.
*G06F 21/00* (2013.01)
*G06F 21/31* (2013.01)
*G06F 21/32* (2013.01)

(52) U.S. Cl.
CPC ............. *G06F 21/316* (2013.01); *G06F 21/32* (2013.01); *G06F 2221/2117* (2013.01)

(58) Field of Classification Search
CPC ... G06F 3/04883; G06F 3/0484; G06F 3/017; G06F 3/0488; G06F 3/04886; G06F 3/041; G06F 21/316; G06F 21/36; H04L 9/3226; H04L 29/06; H04L 2209/80; H04L 63/083; H04L 63/0876; H04M 1/72563; H04M 1/72552; H04M 1/67; H04M 1/663; H04M 1/575; H04M 1/673; H04M 1/72519; H04M 1/72522; H04M 3/42153
USPC ............................................................ 726/1
See application file for complete search history.

(56) References Cited

U.S. PATENT DOCUMENTS 5,936,614 A * 8/1999 An et al. ................. 345/173
6,326,952 B1 * 12/2001 Amro et al. ............. 345/168

(Continued)

FOREIGN PATENT DOCUMENTS

EP       2541452       1/2013

OTHER PUBLICATIONS

Draffin, B., et al, "Keysens: passive user authentication through micro-behavior modeling of soft keyboard interaction", In Proc. of the 5th Int. Conf. on Mobile Computing, Applications and Services, 2013, entire document, http://mlt.sv.cmu.edu/joy/publications/KeySens-MobiCASE-2013.pdf.*

(Continued)

*Primary Examiner* — Christopher Brown
*Assistant Examiner* — Ronald Baum
(74) *Attorney, Agent, or Firm* — Perry + Currier Inc.

(57) ABSTRACT

A method of identifying a user of a device having a security policy and including a touch sensitive input device. The method includes receiving data corresponding to use of the touch sensitive input device by the user and determining from the received data at least one feature. Based on the at least one feature and a signature associated with an identifiable user, the method determines a likelihood that the user is the identifiable user and modifies, based on the likelihood, the security policy on the device.

14 Claims, 6 Drawing Sheets

(56) References Cited

U.S. PATENT DOCUMENTS

| | | | | |
|---|---|---|---|---|
| 7,486,810 | B1* | 2/2009 | Accapadi | G06F 21/32 382/124 |
| 8,217,912 | B2* | 7/2012 | Rofougaran | 345/173 |
| 8,310,453 | B1* | 11/2012 | Krack | G06F 21/36 178/18.01 |
| 8,549,656 | B2* | 10/2013 | Blaisdell et al. | 726/27 |
| 8,550,339 | B1* | 10/2013 | Newman et al. | 235/379 |
| 8,638,939 | B1* | 1/2014 | Casey et al. | 380/277 |
| 8,650,635 | B2* | 2/2014 | Griffin | G06F 21/31 382/173 |
| 8,941,466 | B2* | 1/2015 | Bayram et al. | 340/5.82 |
| 2003/0011503 | A1* | 1/2003 | Levenson | 341/200 |
| 2003/0139192 | A1 | 7/2003 | Chmaytelli et al. | |
| 2003/0159044 | A1* | 8/2003 | Doyle et al. | 713/176 |
| 2003/0196097 | A1* | 10/2003 | Korosec | G06Q 20/04 713/185 |
| 2006/0195907 | A1* | 8/2006 | Delfs et al. | 726/26 |
| 2006/0224645 | A1* | 10/2006 | Kadi | G06F 3/0238 708/200 |
| 2007/0040813 | A1* | 2/2007 | Kushler et al. | 345/173 |
| 2008/0092245 | A1 | 4/2008 | Alward et al. | |
| 2008/0122796 | A1* | 5/2008 | Jobs et al. | 345/173 |
| 2008/0209212 | A1* | 8/2008 | Ditzman et al. | 713/167 |
| 2008/0263363 | A1* | 10/2008 | Jueneman et al. | 713/184 |
| 2009/0034804 | A1* | 2/2009 | Cho | G06F 21/83 382/116 |
| 2009/0165121 | A1* | 6/2009 | Kumar | 726/19 |
| 2009/0303187 | A1* | 12/2009 | Pallakoff | 345/169 |
| 2010/0169130 | A1* | 7/2010 | Fineman et al. | 705/5 |
| 2011/0219459 | A1* | 9/2011 | Andreasson | 726/28 |
| 2012/0042076 | A1* | 2/2012 | Kawa et al. | 709/226 |
| 2012/0069131 | A1* | 3/2012 | Abelow | 348/14.01 |
| 2012/0119997 | A1* | 5/2012 | Gutowitz | 345/168 |
| 2012/0149338 | A1* | 6/2012 | Roundtree | 455/411 |
| 2012/0166995 | A1* | 6/2012 | McAleer | 715/773 |
| 2012/0192250 | A1* | 7/2012 | Rakan | 726/2 |
| 2013/0167212 | A1* | 6/2013 | Azar et al. | 726/7 |
| 2013/0234949 | A1* | 9/2013 | Chornenky | 345/169 |

OTHER PUBLICATIONS

Zaliva, V., et al, "Passive User Identification Using Sequential Analysis of Proximity Information in Touchscreen Usage Patterns", 2015, 8th Intl. Conf. on Mobile Computing and Ubiquitous Networking (ICMU), entire document, http://ieeexplore.ieee.org/stamp/stamp.jsp?tp=&arnumber=7061060.*

International Search Report dated May 22, 2013, from International Application No. PCT/CA2013/000220.

Written Opinion of the International Searching Authority dated May 22, 2013, from International Application No. PCT/CA2013/000220.

* cited by examiner

SYSTEM AND METHOD OF ENHANCING SECURITY OF A WIRELESS DEVICE THROUGH USAGE PATTERN DETECTION

FIELD

This application relates to the field of wireless devices, and more specifically, to a system and method of enhancing security of wireless devices through usage pattern detection.

BACKGROUND

Wireless mobile communication devices may include processors, memory, and input/output components such as touch interfaces and displays, and may be capable of executing one or more software applications in addition to providing for voice communications. Examples of software applications may include web browsers, email clients, instant messaging clients, and address books. Additionally, such devices may, for example, be used to browse web sites on the Internet, to transmit and receive graphics, and to execute streaming media applications. Such devices may operate on a variety of networks, including cellular networks, wireless local area networks, and combinations thereof.

One problem with wireless mobile communication devices is that such devices may provide access to sensitive data or applications, or more generally, content. Such content may be sensitive for any of a variety of reasons, such as personal reasons (e.g. personal photos), commercial reasons (e.g. customer lists), or legal reasons (e.g. patient data). This content may have various levels of sensitivity.

Approaches to control access to such content on wireless devices include the use of passwords and timers. For example, wireless devices may require a user to provide a pre-determined password prior to permitting access to sensitive content. Similarly, wireless devices may be designed to automatically enter a locked state after a certain period of inactivity, or, similarly, automatically prevent access to sensitive content after such period but continue to permit access to regular content.

One problem with use of a password is that such requirements may be considered unfriendly or overly intrusive by users, particularly for devices designed for single-user use. One problem with use of an inactivity timer is that if an unlocked phone is accessed by an unauthorized third party prior to expiry of the timer, then access to the secure content may continue to be permitted for an indefinite period of time.

BRIEF DESCRIPTION OF THE DRAWINGS

With reference to embodiments thereof, the description will next be described in relation to the drawings, which are intended to be non-limiting examples of various embodiments of the present description, in which.

DETAILED DESCRIPTION

Figure 1:
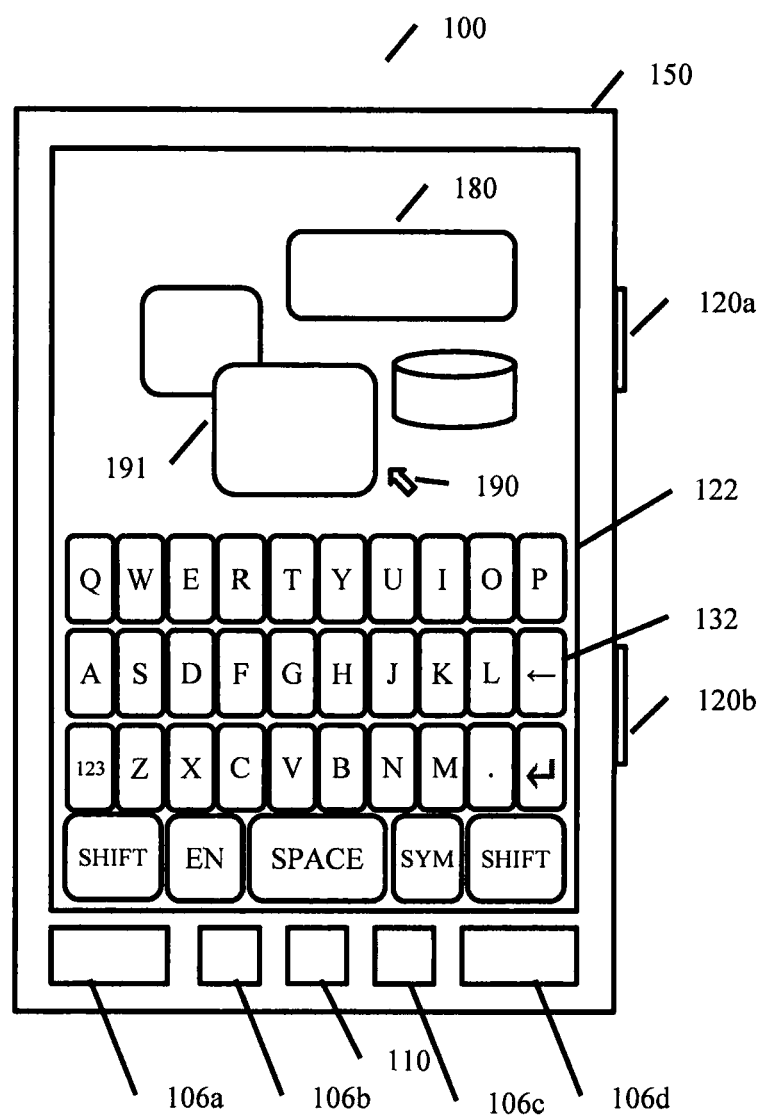
FIG. 1 is a front view illustrating a wireless device in accordance with an illustrative embodiment of the present description.

In the following description, details are set forth to provide an understanding of illustrative embodiments of the description. In some instances, certain software, circuits, structures and techniques have not been described or shown in detail in order not to obscure the application. Those of skill in the art will understand that the following detailed description of illustrative embodiments of the description does not limit the implementation of embodiments of the description to any particular computer programming language. Embodiments of the description may be implemented in any computer programming language provided that the operating system ("OS") provides the facilities that may support the present description. For instance, an embodiment of the present description may be implemented in the JAVA™ computer programming language (or other computer programming languages such as C or C++). Those skilled in this art will also appreciate that any limitations presented by such an embodiment would be a result of a particular type of operating system or computer programming language and would not be a limitation of the present description. Alternative embodiments of the present description may also be implemented in hardware or in a combination of hardware and software.

In a first broad aspect of the present description, there is provided a method of identifying a user of a device having a security policy and comprising a touch sensitive input device. The method comprises: receiving data corresponding to use of the touch sensitive input device by the user; determining from the received data at least one feature; determining, based on the at least one feature and a signature associated with an identifiable user, a likelihood that the user is the identifiable user; and modifying, based on the likelihood, the security policy on the device.

In an alternative embodiment, the touch sensitive input device is a touchscreen; and the data corresponding to use of the touchscreen by the user comprises data corresponding to use by the user of a virtual keyboard displayed on the touchscreen.

In an alternative embodiment, the use by the user of a virtual keyboard displayed on the touchscreen comprises the user interacting with the touchscreen at a plurality of areas on the touchscreen; and the data corresponding to use of the touchscreen by the user further comprises data corresponding to the plurality of areas on the touchscreen.

In an alternative embodiment, the device further comprises a connection to a partition, and the modifying the security policy on the device comprises restricting access to the user to the partition through the connection.

In an alternative embodiment, the partition further comprises at least one application, and the modifying the security policy on the device further comprises restricting access to the user to the at least one application.

In an alternative embodiment, the partition further comprises data, and the modifying the security policy on the device further comprises restricting access to the user to at least a portion of the data.

In an alternative embodiment, the modifying the security policy on the device comprises a modification selected from the group consisting of: (a) permitting access to the user to an application on the device; (b) permitting access to the user to data on the device; (c) restricting access to the user to an application on the device; (d) restricting access to the user to data on the device; (e) requiring the user to provide a pre-determined password; (f) sending a message to an external computing device; and (g) performing a security wipe of the device.

In an alternative embodiment, the method further comprises: receiving training data corresponding to use of the touch sensitive input device by the identifiable user; determining from the received training data at least one feature; calculating, based on the at least one feature determined from the received training data, the signature associated with the identifiable user; and storing the signature on the device.

In an alternative embodiment, the method further comprises: receiving further data corresponding to use of the touch sensitive input device by the user; determining from the further received data at least one feature; determining, based on the at least one feature determined from the further received data and the signature associated with an identifiable user, a second likelihood that the user is the identifiable user; and modifying, based on the second likelihood, the security policy on the device.

In a second broad aspect of the present description, there is provided a system comprising a device having a security policy, a touch sensitive input device, and a computer readable memory storing computer executable instructions thereon that when executed by the device perform the method of the first broad aspect of the present description.

In a third broad aspect of the present description, there is provided a method of modifying a security policy of a device. The method comprises: receiving data corresponding to use of the device by a user; determining, based on the data, a first likelihood that the user is an identifiable user; modifying the security policy on the device to correlate to the first likelihood; receiving further data corresponding to further use of the device by the user; determining, based on the further data, a second likelihood that the user is the identifiable user; and modifying the security policy on the device to correlate to the second likelihood.

In an alternative embodiment, the data corresponding to use of the device by the user comprises data selected from the group consisting of: (a) data corresponding to the user's use of a touch sensitive input device; (b) data corresponding to the user's use of a virtual keyboard on a touchscreen; (c) data corresponding to the user's use of applications accessible through the device; (d) data corresponding to the user's use of application features accessible through the device; (e) data corresponding to the user's use of a physical keyboard; (f) data corresponding to the user's selection among a plurality of options; (g) data corresponding to the user's use of phone numbers; (h) data corresponding to the user's access of websites; (i) data corresponding to the user's writing style; and (j) data corresponding to the user's typographical errors.

In an alternative embodiment, the data corresponding to use of the device by the user comprises data corresponding to use of a touchscreen by the user; the data corresponding to use of the touchscreen by the user comprises data corresponding to use by the user of a virtual keyboard displayed on the touchscreen; the use by the user of a virtual keyboard displayed on the touchscreen comprises the user interacting with the touchscreen at a plurality of areas on the touchscreen; and the data corresponding to use of the touchscreen by the user further comprises data corresponding to the plurality of areas on the touchscreen.

In an alternative embodiment, the device further comprises a connection to a partition, and at least one of the modifying the security policy on the device to correlate to the first likelihood and the modifying the security policy on the device to correlate to the second likelihood comprises restricting access to the user to the partition through the connection.

In an alternative embodiment, the partition further comprises at least one application, and restricting access to the user to the partition through the connection comprises restricting access to the user to the at least one application.

In an alternative embodiment, at least one of the modifying the security policy on the device to correlate to the first likelihood and the modifying the security policy on the device to correlate to the second likelihood comprises a modification selected from the group consisting of (a) permitting access to the user to an application on the device; (b) permitting access to the user to pre-determined data on the device; (c) restricting access to the user to an application on the device; (d) restricting access to the user to pre-determined data on the device; (e) requiring the user to provide a pre-determined password; (f) sending a message to an external computing device; and (g) performing a security wipe of the device.

In an alternative embodiment, the method further comprises: receiving training data corresponding to use of the device by the identifiable user; determining from the received training data at least one feature; calculating, based on the at least one feature determined from the received training data, a signature associated with the identifiable user; and storing the signature on the device; wherein at least one of the determining a first likelihood that the user is an identifiable user and the determining a second likelihood that the user is the identifiable user comprises a calculation involving the signature.

In an alternative embodiment, the receiving data corresponding to use of the device by a user comprises receiving data corresponding to a first type of use of the device by the user; and the receiving further data corresponding to further use of the device by the user comprises receiving further data corresponding to the first type of use of the device by the user.

In an alternative embodiment, the receiving data corresponding to use of the device by a user comprises receiving data corresponding to a first type of use of the device by the user; and the receiving further data corresponding to further use of the device by the user comprises receiving further data corresponding to a second type of use of the device by the user.

In a fourth broad aspect of the present description, there is provided a system comprising a device having a security policy and a computer readable memory storing computer executable instructions thereon that when executed by said device perform the method of the third broad aspect of the present description.

FIG. 1 is a front view illustrating a wireless device 100 that is operative for implementing an illustrative embodiment of the application. The wireless device 100 includes a casing 150, a touchscreen 122, a graphical user interface ("GUI") 180 displayed on the touchscreen 122, a virtual keyboard (or keypad) 132 displayed on the touchscreen 122, a trackpad (or trackwheel) 110, select buttons 120a, 120b, control buttons 106a, 106b, 106c, 106d, and various inputs/outputs (e.g., headphones jack, power connector jack, data interface ports, etc.) (not shown). In alternative embodiments, wireless device 100 may also include a physical keyboard (or keypad), either in addition to or in replacement of virtual keyboard (or keypad) 132. In yet another alternative embodiment, wireless device 100 may also include a physical keyboard (or keypad) that is configured to sense touch, for example, if the primary exposed surface of each key is constructed to be touch sensitive.

Internally, the wireless device 100 includes one or more circuit boards (not shown), a central processing unit ("CPU") or microprocessor 138, memory 124, 126, 200, a battery 156, an antenna (not shown), and the like, which are operatively coupled to the various inputs/outputs, the touchscreen 122, and the like, as will be described below.

Figure 2:
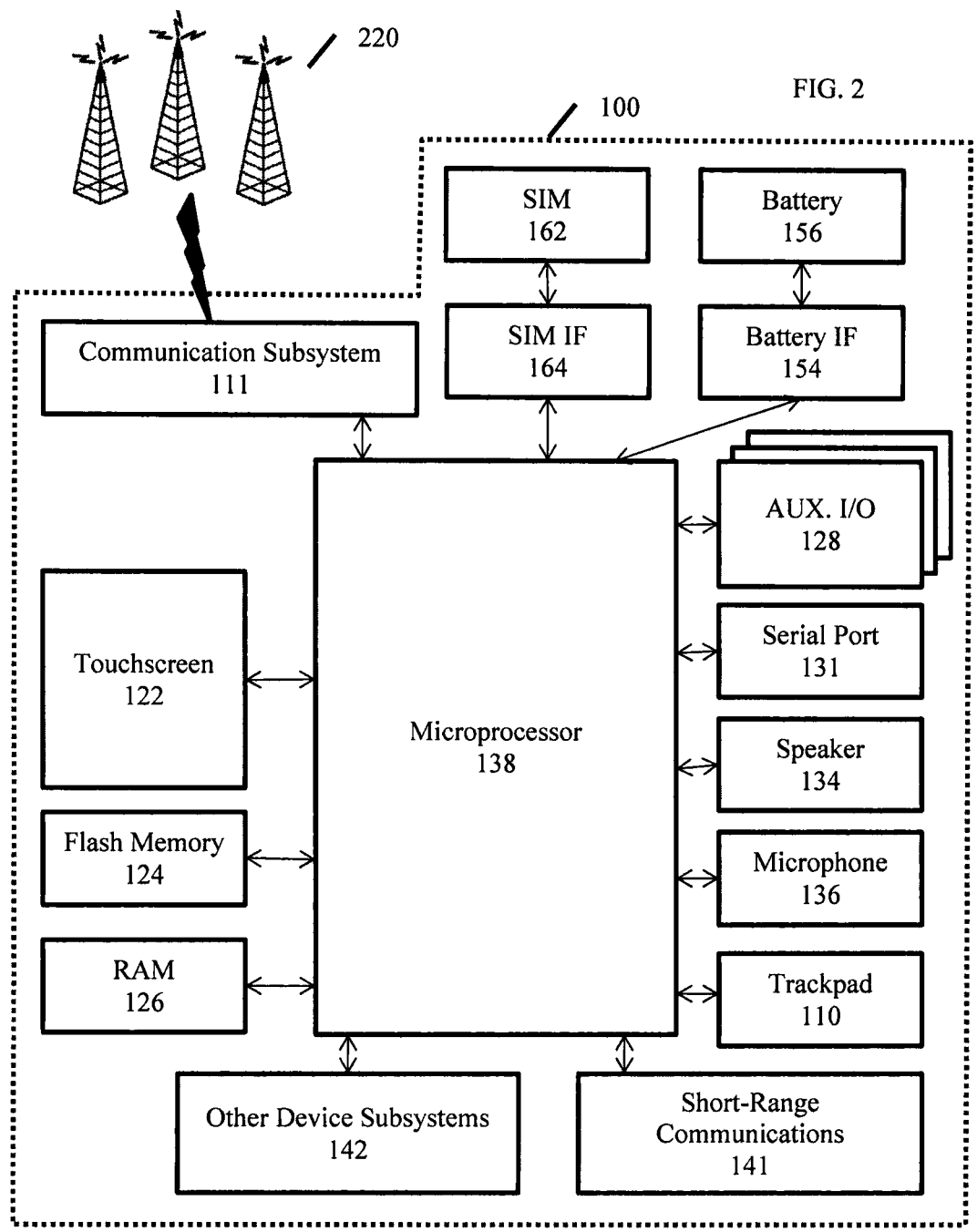
FIG. 2 is a block diagram illustrating the wireless device of FIG. 1 and a wireless network in accordance with an illustrative embodiment of the present description.

FIG. 2 is a block diagram illustrating the wireless device 100 of FIG. 1 and a wireless network 220 that is operative to communicate with the wireless device 100. The wireless network 220 may include antenna, base stations, access points, transceivers, supporting radio equipment, and the like, as known to those of ordinary skill in the art, for supporting wireless communications between the wireless device 100 and other devices (not shown).

The wireless device 100 may be a two-way communication device having voice and/or advanced data communication capabilities, including the capability to communicate with other devices. Depending on the functionality provided by the wireless device 100, it may be referred to as a data messaging device, a two-way pager, a cellular telephone with data messaging capabilities, a wireless Internet appliance, a data communication device (with or without telephony capabilities), a Wi-Fi device, a WLAN device, a dual-mode (i.e., Wi-Fi and cellular) device, a portable audio device, a tablet computer, or a smart phone. More generally, aspects of the present description may be applied to other electronic devices such as laptop and desktop computers and handheld computers, whether or not wired or wireless.

The wireless device 100 has a communication subsystem 111, which includes a RF receiver, a RF transmitter, and associated components. As will be apparent to those skilled in the relevant art, the particular design of the communication subsystem 111 depends on the communication network 220 in which the wireless device 100 is intended to operate.

The wireless device 100 may be capable of cellular network access and hence the wireless device 100 may have a subscriber identity module (or "SIM" card) 162 for inserting into a SIM interface ("IF") 164 in order to operate on the cellular network (e.g., a global system for mobile communication ("GSM") network).

The wireless device 100 may be a battery-powered device and so it may also include a battery IF 154 for receiving one or more rechargeable batteries 156. The battery (or batteries) 156 provides electrical power to most if not all electrical circuitry in the wireless device 100, and the battery IF 154 provides for a mechanical and electrical connection for it.

The wireless device 100 includes a microprocessor 138 which controls overall operation of the wireless device 100. The microprocessor 138 interacts with device subsystems such as the touchscreen 122, a flash memory 124 or other persistent store, a random access memory ("RAM") 126, auxiliary input/output ("I/O") subsystems 128, a serial port (e.g., a universal serial bus ("USB") port) 131, the trackpad 110, control buttons 106a, 106b, 106c, 106d, a speaker 134, a microphone 136, a short-range communications subsystem 141, and other device subsystems 142. The microprocessor 138, in addition to performing operating system functions, preferably enables execution of software applications on the wireless device 100.

The wireless device 100 may also have a touchscreen 122 comprising a touch sensor positioned overtop a display screen, or integrated therewith. The touchscreen 122 may further comprise a transparent cover positioned over the touch sensor and display screen, or integrated therewith. The wireless device 100 may comprise further circuitry, controllers, and/or processors associated with touchscreen 122 to determine, in the event a user touches the touchscreen 122, where on the touchscreen 122 such touch was made, and to report said position to, for example, an operating system executing on microprocessor 138. As described herein, wireless device 100 may be configured to accept such input as part of a GUI. More generally, touchscreen 122 may be adapted to receive input from a finger (or, for example, a stylus) whether or not there is physical contact with touchscreen 122. In other embodiments of the present description, wireless device 100 may be capable of recording additional aspects of a user's interaction, such as moving and rotating fingers (and stylus), and pressure.

A skilled person in the art will appreciate that while a "user" is typically a human individual, the term "user" extends to all external objects or entities that "use" wireless device 100. For example, a "user" may be an animal user, or, in other illustrative embodiments, a "user" may be an automated software or hardware component (e.g. a software agent or a physical robot interacting with wireless device 100).

Figure 3:
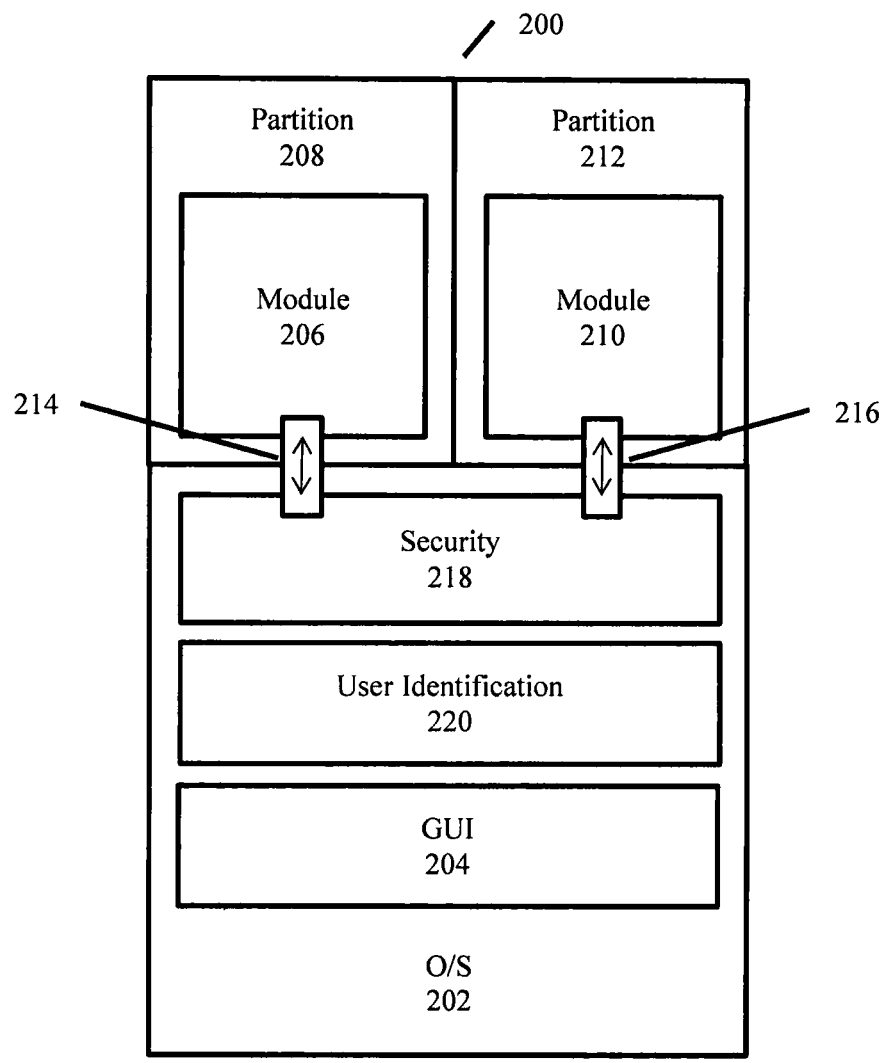
FIG. 3 is a block diagram illustrating a memory of the wireless device of FIGS. 1 and 2 in accordance with an illustrative embodiment of the present description.

FIG. 3 is a logical block diagram illustrating a memory 200 of the wireless device 100 of FIGS. 1 and 2. The microprocessor 138 is coupled to the memory 200. The memory 200 has various hardware and software components for storing information (e.g., instructions, applications, software, data, database tables, test parameters, etc.) for enabling operation of the wireless device 100 and may include flash memory 124, RAM 126, ROM (not shown), disk drives (not shown), and the like. In general, the memory 200 may include a variety of storage devices typically arranged in a hierarchy of storage as understood to those skilled in the art.

The wireless device 100 may include computer executable programmed instructions for directing the wireless device 100 to operate in a pre-determined manner. The programmed instructions may be embodied in one or more hardware or software modules 202, 204, 206, 210, 218, 220 which may be resident in the memory 200 of the wireless device 100. Alternatively, the programmed instructions may be embodied on a computer readable medium (such as a CD disk or floppy disk) which may be used for transporting the programmed instructions to the memory of the wireless device 100. Alternatively, the programmed instructions may be embedded in a computer-readable signal or signal-bearing medium that may be uploaded to a network 220 by a vendor or supplier of the programmed instructions, and this signal or signal-bearing medium may be downloaded through an interface 111, 131, 141 to the memory of the wireless device 100 from the network 220 by end users or potential buyers.

Operating system ("O/S") software module 202 used by the microprocessor 138 may be stored in a persistent store such as the flash memory 124, which may alternatively be a read-only memory ("ROM") or similar storage element (not shown). Those skilled in the relevant art will appreciate that the operating system, specific device applications, or parts thereof, may be temporarily loaded into a volatile store such as RAM 126 in the course of normal operation of wireless device 100.

To provide a user-friendly environment to control the operation of the wireless device 100, operating system ("O/S") software module 202 resident on the wireless device 100, if executed by the wireless device 100, provides a basic set of operations for supporting various applications typically operable through the GUI 180 and supporting GUI software module 204. For example, the O/S software module 202 may enable basic input/output system features to obtain input from the auxiliary I/O subsystems 128, virtual keyboard 132, trackpad 110, and the like, and for facilitating output to the user through touchscreen 122, speaker 134, and the like.

A user may interact with the wireless device 100 and software modules 202, 204, 206, 210, 218, 220 using the GUI 180 presented to a user through execution of O/S software module 202 and GUI software module 204 by wireless device 100. In general, a GUI is used to convey and receive information to and from users and can include a variety of GUI objects or controls, including text, labels, windows, icons, toolbars, drop-down menus, dialog boxes, fields, buttons, and the like, all well-known to those skilled in the relevant art. GUIs are supported by common operating systems and, more particularly, may enable a user to input data, choose commands, execute application programs, manage computer files, and perform other functions through use of an input or pointing device such as a trackpad 110 or touching the touchscreen 122. The GUI 180 may include a cursor 190, and various selectable objects and icons 191. For example, a user may interact with the GUI 180 presented on the touchscreen 122 by touching (or, more generally, contacting or nearly contacting) an object (e.g., an icon) 191 on the touchscreen 122 with his or her finger (or stylus), causing a "click" to register.

Memory 200 may further comprise partition 208 and partition 212, respectively comprising module 206 and module 210. Modules 206, 210 may each comprise a combination of applications and data that a user of wireless device 100 may desire to access or utilize.

In an illustrative embodiment wherein wireless device 100 has a primary user, partition 208 may constitute a "personal" partition and partition 212 may constitute a "corporate" partition. Namely, module 206 may therefore comprise applications and data that the primary user of wireless device 100 considers personal in nature, such as a personal e-mail application configured to access personal e-mail accounts and store personal e-mails, an address book application storing contact information for personal contacts and organizations, and personal photos and videos. In contrast, corporate partition 212 may comprise applications and data that are related to the employment of the primary user of wireless device 100. For example, corporate partition 212 may comprise a corporate e-mail application configured to access the user's corporate e-mail account and store corporate e-mails, an address book application storing contact information for corporate contacts and organizations, and corporate information more generally. GUI 180 may enable a user to request access to applications and data within either partition. For example, a user's selection of an icon displayed by GUI 180 may cause the operation system executing on wireless device 100 to connect to a corporate e-mail application in module 210, execute the application, and provide the user with access to the application through GUI 180.

In alternative embodiments of the present description, there may be more than two partitions. For example, if wireless device 100 is a multi-user device, there may be a partition corresponding to each user. By way of further example, a single user may be associated with multiple corporate environments, such that each may be made to correspond to a separate corporate partition of wireless device 100.

The skilled person in the relevant art will appreciate that wireless device 100 and memory 200 may be configured so that applications and data within partitions 208, 212 may be accessed through connections 214, 216, respectively. Such connections are logical connections representative of communication links between software modules during execution and may not correspond to a physical connection within wireless device 100. For example, in an illustrative embodiment of the present embodiment, partitions 208, 212 may each comprise an encrypted file stored on flash memory 124 and O/S software module 202 may comprise software capable of accessing the encrypted file. Alternatively, in another illustrative embodiment, personal partition 208 may be as described above while corporate partition 212 may be located on a separate device. In this embodiment, O/S software module 202 may comprise software capable of connecting to partition 212 over a software connection mediated by short-range communications subsystem 141, such as an integrated Bluetooth™ adapter. More particularly, wireless device 100 may comprise a Blackberry™ Playbook™ tablet computer, corporate partition 212 may be physically located on a Blackberry™ smartphone, and connection 216 may be Blackberry Bridge™ connection software comprising complementary software on both devices. In this embodiment, module 210 may comprise, for example, a corporate e-mail application with access to a user's corporate e-mails.

Access to partitions 208, 212 may be further limited to be only through connections 214, 216, such access governed by security module 218 of O/S software module 202. Such configuration may limit unauthorized access to applications and data within a partition. Persons skilled in the relevant art will be familiar with technical means to implement such security policies, including the use of physical and software means to limit access to partitions 208, 212, including, for example, hardware and software encryption.

In one illustrative embodiment, one aspect of security module 218 is that applications residing within a module of one partition may not access data or applications residing within a module of another partition. For example, continuing the previously described embodiment, a personal e-mail application in module 206 may be prevented from attaching to an email a computer file located in module 210 of corporate partition 212. In another illustrative aspect, security module 218 may prevent an application residing within a module from accessing or transferring data outside the partition generally. A person skilled in the relevant art may characterize partitions so configured to be a "sandbox", intended to protect the security of wireless device 100 and to limit and prevent inadvertent or malicious disclosure of sensitive information.

In a further illustrative aspect, security module 218 may also govern access to partitions 208, 212 (or other aspects or components of wireless device 100) on the basis of the user that is likely using wireless device 100, such identification as determined through any number of means as discussed in greater detail herein. Access may be also governed in view of the likelihood that the user using wireless device 100 is or is not one or more predetermined users, again as determined through any number of means as discussed in greater detail herein. On the basis of this information, security module 218 may be configured, or provide configurable options, to perform any number of operations (as mediated by wireless device 100, the operating instance of O/S software module 202, and the GUI 180, as the case may be). For example, security module 218 may be configured to, on the basis of the above information, (i) permit user access to all applications and data within a given partition, such as corporate partition 212; (ii) prohibit user access to all applications and data within a given partition, such as personal partition 208; (iii) permit user access to only one or more selected applications and/or selected data within a given partition, such as only a corporate address book application of corporate partition 212 and not a corporate e-mail application; (iv) have the user to enter a security password to continue use of the device (or application) generally (e.g. in the event security module 218 is informed that an unauthorized user is likely using the wireless device 100); (v) notify a system administrator of unauthorized use by sending a message through communication subsystem 111 over network 220; (vi) notify a separate device of unauthorized use of a device (such as in the event corporate partition 212 is on a separate physical device (e.g. a Blackberry™ smartphone), wireless device 100 is accessing corporate partition 212 over short-range communications subsystem 141 (e.g. a Blackberry Bridge™ connection), and security module 218 is informed that it is likely that an unauthorized user is using wireless device 100), the separate device then, for example, displaying an alert relating to the unauthorized use or presenting the user of the separate device with the options of terminating the connection between the devices, locking the wireless device 100, or sending a message to the wireless device 100 for display thereon; (vii) report the user of the wireless device 100 to an external server through communication subsystem 111 over network 220, the external server then, for example, storing such information for the purpose of future review or audit, or providing access to such information via a website or other service; and (viii) perform a security wipe of memory on wireless device 100, including, for example, a partition such as corporate partition 212.

User identification methods are now discussed in greater detail, such methods as may be embodied in computer executable instructions comprising user identification module 220 of O/S module 202. In an illustrative embodiment, wireless device 100 may be configured to use a standard username and password scheme to identify users of wireless device 100. For example, wireless device 100 may be configured with multiple user profiles each having a unique username and password, and users are requested to logon to and logoff from wireless device 100 at the start and end of each user's respective use of wireless device 100. As noted above, each user may be associated with certain permissions as governed by security module 218, such as the ability to access only certain information in certain partitions. Persons of skill in the relevant art are well versed in implementing such systems.

In another illustrative embodiment, wireless device 100 may be intended to be a single-user device having only a single user who would be authorized to have access to all applications and data on wireless device 100, including on each of partitions 208, 212. In this embodiment, wireless device 100 may be configured to store a single password and, upon a user of wireless device 100 correctly inputting the correct password, identify the current user of wireless device 100 as the authorized user of the wireless device 100. In other illustrative embodiments, wireless device 100 (and user identification module 220) may rely upon known physical biometric data such as fingerprint scans, retina scans, or facial structure, as received by wireless device 100 through appropriate auxiliary input/output subsystems 128, such as a fingerprint scanner or camera, to determine the identity of the user of wireless device 100. In still other illustrative embodiments, wireless device 100 (and user identification module 220) may rely upon other authentication technology such as smart cards and proximity authenticators to determine the identity of the user of wireless device 100. Persons of skill in the relevant art are well versed in implementing such systems.

In a further illustrative embodiment of the present description, characteristics or aspects of a user's behaviour may also be used to identify the user of a wireless device 100, such systems sometimes also known as behavioural biometrics. Generally speaking, behavioural biometrics refers to methods of identifying users (e.g. human individuals) through analyzing the behaviour of a user, including, for example, the typing patterns of a user, the voice of a user, or even the gait during walking of a user. In a further illustrative embodiment, the manner of usage of a wireless device 100 by a user may be the relevant data, including, in an illustrative embodiment described in greater detail herein, a user's use of a virtual keyboard such as virtual keyboard 132.

In an illustrative embodiment, a training phase to teach a device to recognize a particular user using biometric information is used prior to using biometric data (including behavioural biometric data) as part of a user identification method, such training herein described in greater detail with reference to wireless device 100 and FIG. 4 comprising steps taken once a training phase is commenced by, for example, a user selecting such a manual option through the GUI 180.

At Step 402, wireless device 100 may receive biometric data through an appropriate input subsystem, such as touchscreen 122, trackpad 110, or microphone 136. A skilled person in the relevant art will be familiar with selecting and configuring an input subsystem to collect the desired biometric data. For example, a wireless device 100 may be configured to request a user speak a pre-determined phrase into microphone 136, or to type a predetermined sentence through virtual keyboard 132 displayed by touchscreen 122. In some illustrative embodiments, wireless device 100 may request that the user perform the same action multiple times in order to obtain sufficient data. In other illustrative embodiments, this receiving of biometric data may occur in the background during regular use of wireless device 100, and comprise part or all of the regular usage of wireless device 100.

At Step 404, wireless device 100 may pre-process the received biometric data in order to facilitate further analysis. This pre-processing will depend on the type of biometric data that is received. For example, if the biometric data comprises voice data, this data may be normalized and processed through band-pass filters appropriate for human voices. Alternatively, if the biometric data comprises an image of an individual's fingerprint, this image data may have its contrast adjusted, and various image post-processing filters applied thereto such as edge enhancement or de-speckling. In other illustrative embodiments, biometric data that may not correspond (or may likely not correspond) to the particular user in question may also be removed. This may be the case in the event Step 402 occurs in the background during regular use, and such circumstances may be identified by indicia such as wireless device 100 being used to access password protected websites using a username not associated with the particular user in question.

At Step 406, wireless device 100 may extract features from the processed biometric data, and at Step 408, wireless device 100 may generate a signature from the extracted features. Such features and signature are selected by a skilled person in the relevant art so that future biometric data can be compared against the signature for the purpose of identifying a user. Accordingly, these features and the signature calculated therefrom are highly dependent upon the particular biometric data received, and a person of skill in the relevant art would be familiar with techniques for appropriately selecting features and generating signatures.

For example, in one illustrative embodiment, biometric data may comprise an user's input of his or her name, and at Step 402, the user is requested to write his or her name ten times. Features that may be extracted from this biometric data include, for each instance of the user writing his or her name, the amount of time taken to write the name, the major and minor axis of the name, and the number of disjoint segments comprising the name. A signature that may be generated from these features may comprise, for example, an average value for each feature, along with a set of numeric weights corresponding to each feature, these weights corresponding to the relative importance of each feature for identifying a user using the particular biometric data in question. These weights may, for example, be representative of the user's consistency with regard to each feature, and may, for example, be directly calculated from predetermined metrics such as the standard deviation of values for each feature.

At Step 410, wireless device 100 may store the calculated signature in memory on wireless device 100 for subsequent use, such use herein described in greater detail with reference to wireless device 100 and FIG. 5 comprising steps taken once a user identification method or operation is commenced by, for example, a user requesting access to data and applications on wireless device 100. In this illustrative embodiment, wireless device 100 is assumed to be a single user device for which a single signature has been stored as corresponding to the authorized user of wireless device 100.

At Step 502, wireless device 100 may receive biometric data through an appropriate input subsystem, such as touchscreen 122, trackpad 110, or microphone 136. A skilled person in the relevant art will be familiar with selecting and configuring an input subsystem to collect desired biometric data. For example, a wireless device 100 may be configured to request a user speak a pre-determined phrase into microphone 136, or to type a predetermined sentence through virtual keyboard 132 displayed by touchscreen 122. In some illustrative embodiments, wireless device 100 may request that the user perform the same action multiple times in order to obtain sufficient data. In other illustrative embodiments, this receiving of biometric data may occur in the background during regular use of wireless device 100, and comprise part or all of the regular usage of wireless device 100.

At Step 504, wireless device 100 may pre-process the received biometric data in order to facilitate further analysis. This pre-processing will depend on the type of biometric data that is received. For example, as describe previously, if the biometric data comprises voice data, this data may be normalized and processed through band-pass filters appropriate for human voices. Alternatively, if the biometric data comprises an image of an individual's fingerprint, this image data may have its contrast adjusted, and various image post-processing filters applied thereto such as edge enhancement or de-speckling.

At Step 506, wireless device 100 may extract the same features from the processed biometric data as extracted at Step 406.

At Step 508, wireless device 100 may compare the extracted features to the stored signature. For example, if the biometric data is a recording of a user reading a pre-determined passage of text, the comparison may comprise comparing the time taken to read the passage against the corresponding value stored in the signature, and further comparing the dominant frequency of the voice against the corresponding value stored in the signature.

At Step 510, wireless device 100 may determine the likelihood that the user that provided the biometric data at Step 502 corresponds to the authorized user having the stored signature. This may, for example, be a function of the level of similarity determined when the extracted features are compared to the stored signature at Step 508, weighted by means of the numeric weights that may also comprise part of the stored signature. That is, in an illustrative embodiment, a pre-determined algorithm may be used to convert a numeric metric of similarity (e.g. a weighted sum of differences) into a percentage likelihood that the user that provided the biometric data at Step 502 corresponds to the single authorized user of wireless device 100.

Figure 4:
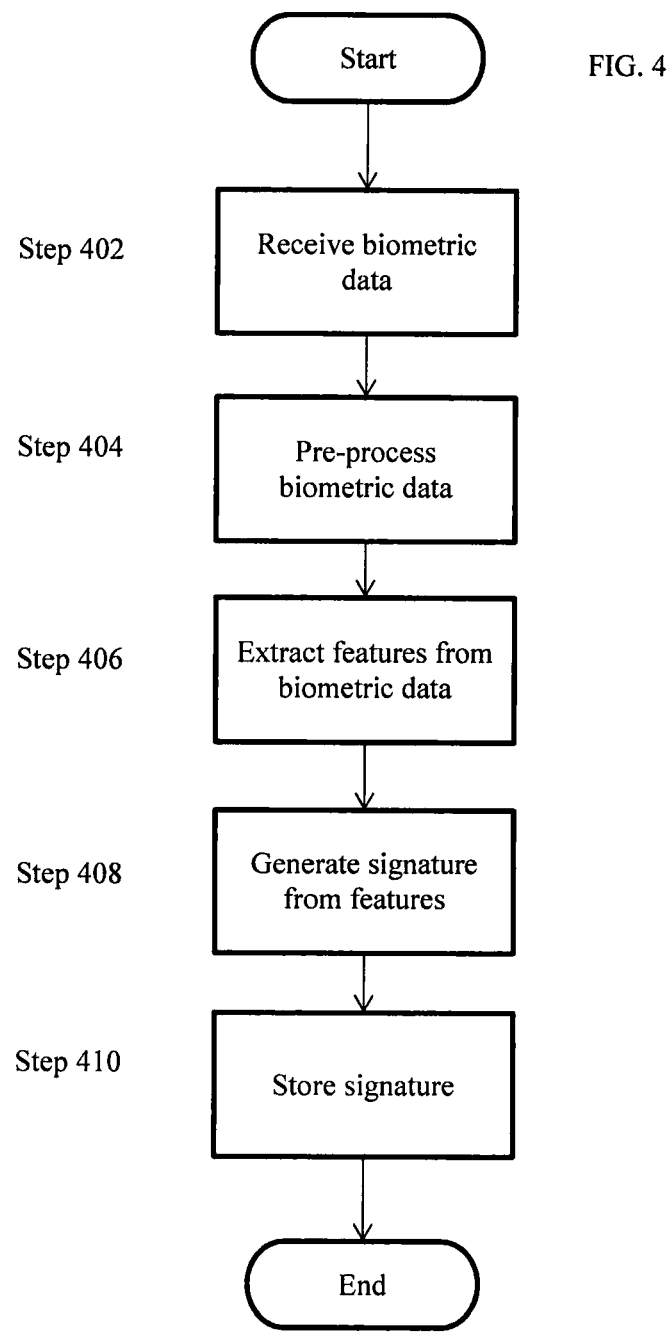
FIG. 4 is a flow chart depicting a training operation at the wireless device of FIG. 1 in accordance with an illustrative embodiment of the present description.
Figure 5:
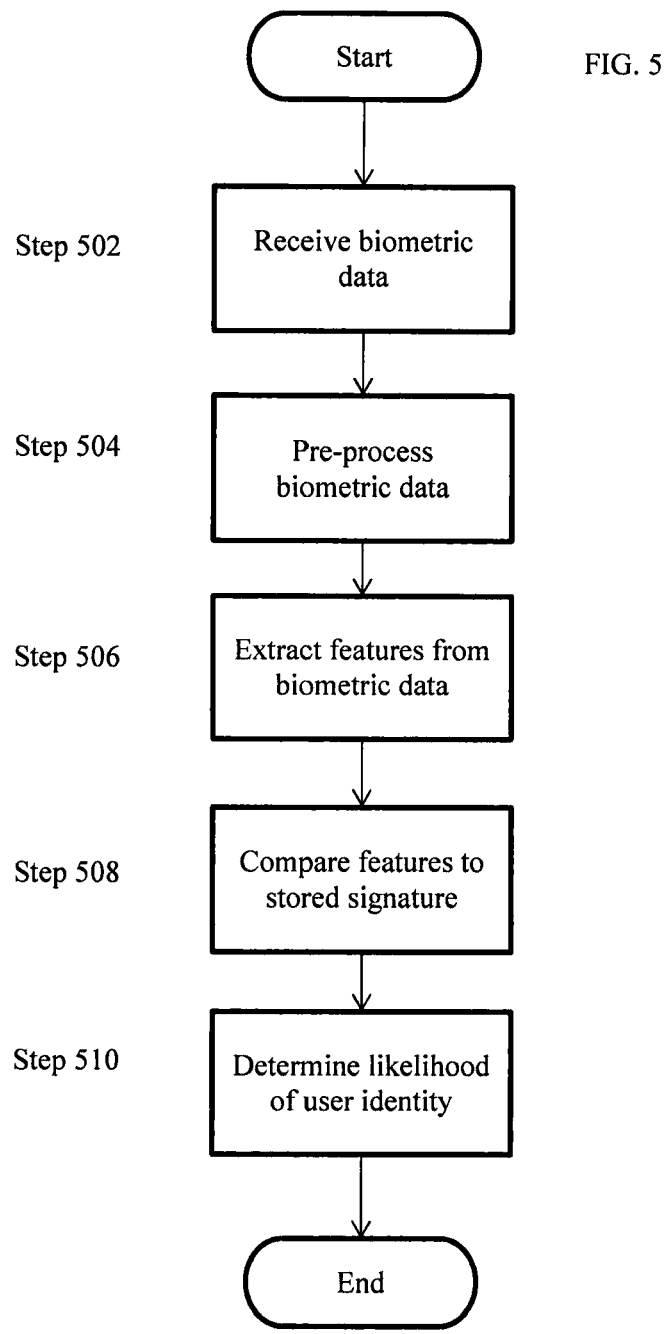
FIG. 5 is a flow chart depicting a user identification operation at the wireless device of FIG. 1 in accordance with an illustrative embodiment of the present description.
Figure 6:
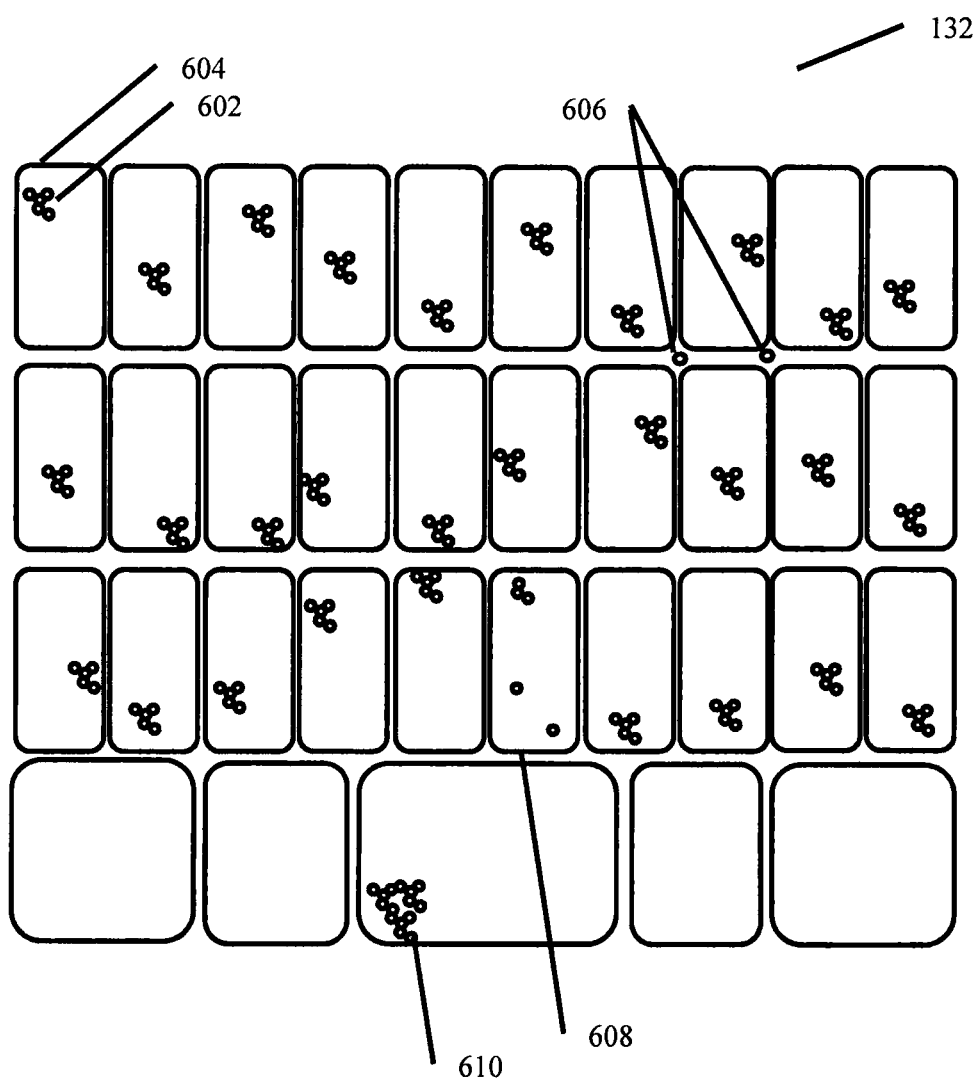
FIG. 6 is an illustrative virtual keyboard having data points plotted thereon in accordance with an illustrative embodiment of the present description.

Now with reference to FIG. 6 illustrating an exemplary virtual keyboard, the methods illustrated by FIG. 4 and FIG. 5 may be further described wherein the biometric data comprises a user's use of a virtual keyboard such as virtual keyboard 132, and the wireless device 100 performs the following steps.

Step 402 may comprise receiving a set of data points indicating where on virtual keyboard 132 a touch was registered. Such data points may be received, for example, as a set of X-Y coordinates corresponding to the layout of virtual keyboard 132, the origin being, for example, the lower left hand corner of virtual keyboard 132. For ease of reference, an exemplary set of data points has been plotted on virtual keyboard 132, each dot representing a single touch (e.g. data points 602 positioned on key 604 corresponding to the letter Q). As previously noted, in other embodiments of the present description, the biometric data may comprise additional information that wireless device 100 may be capable of recording, such as movement, rotation, and pressure.

Step 404 may comprise pre-processing such as removing extraneous data points. For example, data points 606 may be removed during pre-processing on the basis that they do not correspond to a key on virtual keyboard 132.

Step 406 may comprise calculating a centerpoint for each set of data points corresponding to a particular key on virtual keyboard 132, a centerpoint being the generalization of a "median" to data in two or more dimensions. In other illustrative embodiments, a weighted average or another mathematical calculation may be used to extract one or features from the set of data points.

Step 408 may comprise calculating a signature comprising the centerpoint for each set of data points corresponding to each key on virtual keyboard 132, together with a corresponding weight for each key inversely correlated to the average deviation for data points corresponding to such key. For example, data points corresponding to key 608 are widely dispersed, and accordingly, the calculated signature may assign a relatively low weight to this key in comparison to, for example, the weight assigned to key 610 corresponding to a dense set of data points.

Step 410 may comprise storing the calculated signature, and Steps 502, 504, and 506 may operate in a similar fashion as described for Steps 402, 404, and 406.

At Step 508, the comparison may comprise calculating a weighted sum of the pairwise distance between the centerpoints calculated at Step 506 and the centerpoints stored in the signature.

At Step 510, the likelihood of the user providing biometric data at Step 502 corresponding to the authorized user having the stored signature may be calculated to be a percentage between zero and one hundred percent, such percentage likelihood inversely correlated to the above calculated weighted sum. That is, the smaller the weighted sum, the more similar is this user's usage of virtual keyboard 132, and the more likely this user corresponds to the authorized user.

The above-described illustrative embodiment therefore uses patterns in users' usage of a virtual keyboard to differentiate between users. For example, as a simplistic example for the purpose of illustration only, whereas a first user may have a behavioural tendency to use their left thumb to touch key 610, therefore resulting in data points having a centerpoint located in the lower left quadrant of key 610 as illustrated in FIG. 6, a different user may have a behavioural tendency to use their right thumb to touch key 610, therefore resulting in data points having a centerpoint located in the upper right quadrant of key 610. Analysis of usage of a virtual keyboard may therefore permit a wireless device 100 to determine whether an unknown user is indeed the first user, or, more generally, distinguish between the users.

In other illustrative embodiments, a wide variety of other attributes of a user's usage of wireless device 100, particularly those relating to use of touchscreen 122 may be used, alone or in combination, as behavioural biometric data in an analogous manner to that described above. Without limitation, this may include at least the following examples, although those of skill in the relevant art will appreciate that not all devices will be capable of receiving or recording the necessary information: (i) a user's use of a touchscreen such as scrolling and pinching habits (e.g. the portion of a touchscreen used by a user to scroll) and the use of movement, rotation, and pressure, as the case may be; (ii) the applications or application features typically used by a user (e.g. an authorized user may rarely open a social media application preinstalled on a device, or may not take advantage of autocorrect functionality when typing); (iii) a user's cadence and speed when typing on a physical keyboard or virtual keyboard; (iii) a user's choices when multiple alternatives are typically available (e.g. whether a user elects to use physical keyboard or a virtual keyboard, the means by which a user elects to navigate a GUI); (iv) the size, shape, and configuration of a user's interaction with a touchscreen; (v) phone numbers dialed by the user; (vi) websites visited by the user; (vii) a user's writing style (e.g. the choice and frequency of words and phrases); (viii) a user's tendencies in respect of typographical errors (e.g. user's may distinctively misspell particular words); and (ix) a user's use of a touch sensitive input device more generally, such as trackpads and physical keyboards configured to have a touch sensitive surface. Given the disclosure herein, a skilled person in the relevant art would be capable of selecting appropriate features and generating appropriate signatures corresponding to each of these illustrative examples.

Moreover, a skilled person in the relevant art would appreciate that the training of wireless device 100 (as described in greater detail herein with reference to FIG. 4) may occur in different circumstances, depending in part on the attribute or attributes of a user's usage of a device in question.

In a first illustrative embodiment, training may occur on initial setup of wireless device 100, as part of an initialization process. Where physical biometric data is used such as a fingerprint, wireless device 100 may be configured to request that the user, presumed during initial setup to be the authorized user, train wireless device 100 by providing one or more sample fingerprint scans. Similarly, wireless device 100 may be configured to request that a user type a sample of text to obtain biometric data relating to how a user types on a virtual (or physical) keyboard. In alternative embodiments, such training may be manually triggered, for example, by a user selecting such option through the GUI 180.

In a further illustrative embodiment, training may occur on an ongoing or periodic basis without a user manually triggering such training. For example, in an illustrative embodiment, wireless device 100 may be configured to store a buffer in memory comprising the last N touches on a virtual keyboard (e.g. 1000 touches), and on a periodic basis (e.g. every two weeks), wireless device 100 may be configured to execute the Steps 404 to 410 on the basis of the touches stored in the buffer. Alternatively, in another illustrative embodiment, wireless device 100 may be configured to recalculate on a regular basis (e.g. daily) the frequency of use of various applications and features during the preceding M days (e.g. 30 days), such frequency of use comprising a signature that may be stored and subsequently used during user identification operations. In both these embodiments, such training can be considered to occur in the background during normal use of wireless device 100.

In another illustrative embodiment, training (occurring in the background as in the immediately preceding examples) may be triggered by a user inputting a password, thus providing confirmation of the identity of the user. More generally, identification of a user by means of a particular mechanism or attribute (e.g. a user's use of a virtual keyboard) may be used to trigger a training operation in relation to a different mechanism or attribute (e.g. a user's use of a touchscreen's scrolling capabilities). Alternatively, in another illustrative embodiment, training may be continuously conducted. For example, if the attribute is a metric such as the location on a touchscreen that a user scrolls, an average location of said scrolling in a dimension parallel to the minor axis of a touchscreen may be maintained in the memory of wireless device 100, and a new weighted average may be calculated immediately following each instance of the user initiating a scroll action.

A skilled person in the relevant art would also appreciate that, in the same way that training may occur in different circumstances, user identification by wireless device 100 (as described in greater detail herein with reference to FIG. 5) may occur in different circumstances, depending in part on the attribute or attributes of a user's usage of a device in question.

In a first illustrative embodiment, the described method of user identification may be continually operating. For example, Step 502 may comprise every N touches on virtual keyboard 132 made by a user (e.g. 100 touches), and after each N touches is received, remaining Steps 504 to 510 are completed by wireless device 100. In such embodiment, the wireless device 100 would therefore be regularly determining the likelihood that the authorized user is or is not the user accessing wireless device 100.

In another illustrative embodiment, the described method of user identification may be triggered by particular events. For example, Step 502 may comprise each request to access an application on wireless device 100 through use of the GUI 180, the remaining Steps 504 to 510 therefore using this information, as described herein, to determine at the launch of each application the likelihood that the authorized user is or is not the user accessing wireless device 100. In a similar illustrative embodiment, the described method of user identification may be triggered by a request to access sensitive information, for example, data or applications on module 210 of corporate partition 212.

As would be apparent to the skilled person of the relevant art, some of the illustrated embodiments exemplify instances wherein the method of user identification is based on biometric data received in the course of normal usage of wireless device 100 by a user. That is, whereas many traditional methods of user identification require a user to provide his or her password, or biometric data, through a separate process prior to beginning to use wireless device 100 (e.g. a login screen), some of the illustrative embodiments disclosed above may operate in the background during a user's use of wireless device 100, without directly interfering with such use. However, a person of skill in the relevant art will appreciate that the illustrative embodiments disclosed above may also operate in a manner analogous to traditional methods of user identification, namely, that the user provides certain biometric information such as typing sample text on a virtual keyboard prior to being permitted to begin use of wireless device 100.

Furthermore, a plurality of these illustrative embodiments (including traditional methods of user identification) may be concurrently employed on a single device. For example, in an illustrative embodiment, wireless device 100 may be configured so that a determination in the background on the basis of a behavioural attribute of the identity of the user of wireless device 100 (by an executing instance of user identification module 220) may be received by an executing instance of security module 218, and if the user is likely not the sole authorized user of wireless device 100, any of the previously described operations, such as prohibiting further user access to all applications and data within corporate partition 212, may be performed. To re-enable access to applications and data within corporate partition 212, the user may input a password, or, alternatively, provide biometric data such as a fingerprint scan, such input assumed to constitute a robust indicator of the user's true identity, notwithstanding the determination previously made on the basis of behavioural attributes. More generally, determinations of a user's identity, whether in the background or not, may result in an operating instance of security module 218 taking any such actions as described in greater detail herein.

In a further illustrative alternative, security module 218 may be configured, or provide configurable options, to operate in response to a determination of the likelihood of a user's identity, as previously described. In particular, the level of certainty or uncertainty determined by Step 510 may cause different actions to be undertaken. Generally speaking, in this illustrative embodiment, the greater the likelihood that the user of a wireless device 100 is not an authorized user, the more data or applications on wireless device 100 should be restricted.

For example, in one illustrative embodiment, single-user wireless device 100 may be configured to continually perform user identification using a combination of behavioural biometric attributes as well as traditional methods such as a password. Accordingly, security module 218 may be configured as follows: a zero probability of unauthorized use (e.g. a password was inputted) may result in full access to data and applications on wireless device 100, including both partitions 208, 212; a low probability of unauthorized use (e.g. the scrolling habits of the present user of wireless device 100 are similar, but not exactly identical to the stored signature) may result in restricted access to only highly sensitive information (e.g. a corporate e-mail application of module 210); a medium probability of unauthorized use (e.g. a rarely opened application such as a social media application was launched by the present user of wireless device 100) may result in greater restrictions to data and applications on wireless device 100 (e.g. all access to corporate partition 212 is restricted); and a high probability of unauthorized use (e.g. the usage of a virtual keyboard by the present user of wireless device 100 is highly dissimilar to the stored signature) may result in access to wireless device 100 being altogether restricted until, for example, a password is inputted into wireless device 100.

More generally, it is recognized that in some circumstances, certain behavioural biometric attributes may support successive determinations of likelihood as well, to enable functionality analogous to that described immediately above. For example, if only a small amount of data is available (e.g. only a few touches have been received by on virtual keyboard 132), the level of certainty that a given user is or is not the authorized user may be relatively low. As a greater amount of biometric data is obtained, for example through continued use of wireless device 100 by a user, wireless device 100 may be capable of determining with greater certainty whether or not the user is or is not the authorized user. This greater certainty may cause wireless device 100 to both further restrict access to data and applications on wireless device 100 (if there is a greater likelihood of unauthorized use), as well as permit greater access to data and applications on wireless device 100 (if there is greater likelihood of authorized use).

In another illustrative embodiment, where wireless device 100 is a multi-user device, user identification may have the related effect of causing the operating system of wireless device 100 to switch to a different user profile, namely, from a first user to the identified user. In such circumstances, Step 508 of the user identification operation may be modified to comprise comparing the extracted features to the stored signatures corresponding to each of the users of wireless device 100, and Step 510 may be modified to comprise determining the likelihood that the user is each of a number of different user identities. If there is sufficient certainty that a different user is using wireless device 100, security module 218 may be configured, for example, to permit access to a different personal partition on wireless device 100 that is configured to have a personal partition corresponding to each registered user of wireless device 100.

In another illustrative embodiment described above, and as previously described, corporate partition 212 may be located on a separate device than wireless device 100. Accordingly, one illustrative option is for wireless device 100 to receive a signature corresponding to the authorized user of corporate partition 212 from the separate device so that wireless device 100, even if it has not been previously trained to identify such user, may employ all or aspects of the above-described user identification methods. That is, receive and pre-process biometric data (Steps 502, 504), extract features therefrom (Step 506), compare these features against a stored signature (Step 508) received from corporate partition 212 that wireless device 100 is connected to through connection 216, determine the likelihood that a user other than the authorized user is accessing corporate partition 212 through wireless device 100 (Step 510), and further, take appropriate further actions as described herein. A skilled person in the art will appreciate that only some aforementioned types of biometric attributes would be suitable for transfer for such transfer from the separate device to wireless device 100. For example, some attributes, such as a user's use of a virtual keyboard may not be suited for transfer and use as described above, particularly if the devices are of different form factors, whereas other attributes may be more suitable for such transfer, such as the applications opened by a user.

While the foregoing description has been described in some detail for purposes of clarity and understanding, it will be appreciated by one skilled in the art, from a reading of the disclosure, that various changes in form and detail can be made without departing from the true scope of the description.

What is claimed is:

1. A method of performing user identification on a device having a security policy and comprising a touch sensitive input device, the method comprising:
receiving data corresponding to use of a virtual keyboard provided on said touch sensitive input device, received data including a set of data points indicating where on a key of the virtual keyboard a touch was registered when the key was actuated, at least a subset of the data points representing a single touch;
determining from said received data a first location on the key of the virtual keyboard, the first location indicating where the key was touched on the virtual keyboard when the data was received, the first location comprising one of the following: a top left quadrant of the key, a top right quadrant of the key, a bottom left quadrant of the key, or a bottom right quadrant of the key;
determining, based on the first location and a signature associated with a user profile, whether an identity of a user inputting the received data corresponds to the user profile, wherein the signature is calculated based on a second location of the key on the virtual keyboard determined from training data received at the device, the second location indicating where the key on the virtual keyboard was touched when the training data was received, the second location comprising one of the following: the top left quadrant of the key, the top right quadrant of the key, the bottom left quadrant of the key, or the bottom right quadrant of the key, the training data received in a sample of text to obtain biometric data relating to how the user types on the virtual keyboard;

modifying said security policy on said device, based on said determining of whether the identity of the user inputting the received data corresponds to the user profile, by selecting said security policy from a plurality of different levels of access to said device, each of said plurality of different levels of access associated with a respective conditions of whether unauthorized use has occurred at said device; and, repeating, after every N number of touches at the virtual keyboard, where N is based on a level of access to said device as defined in said security policy, the determining from said received data the first location on the key, and the determining whether the identity of the user inputting the received data corresponds to the user profile, said security policy again modified when the identity of the user inputting the received data no longer matches the user profile.

2. The method of claim 1 wherein said device further comprises a connection to a partition, and wherein said modifying said security policy on said device comprises restricting access to said partition through said connection.

3. The method of claim 2 wherein said partition further comprises at least one application, and wherein said modifying said security policy on said device further comprises restricting access to said at least one application.

4. The method of claim 2 wherein said partition further comprises data, and wherein said modifying said security policy on said device further comprises restricting access to at least a portion of said data.

5. The method of claim 1 further comprising:
receiving further data corresponding to use of said touch sensitive input device;
determining from said further received data a third location on the key of the virtual keyboard, the third location indicating where the key was touched on the virtual keyboard when the further data was received;
determining, based on said third location and the signature associated with the user profile, whether the identity of the user inputting the further data corresponds to the user profile; and
modifying, based on said determining whether the identity of the user inputting the further received data corresponds to the user profile, said security policy on said device.

6. A device having a security policy, the device comprising a touch sensitive input device and a computer readable memory storing computer executable instructions thereon that when executed, cause the device to:
receive data corresponding to use of a virtual keyboard provided on said touch sensitive input device, received data including a set of data points indicating where on a key of the virtual keyboard a touch was registered when the key was actuated, at least a subset of the data points representing a single touch;
determine from said received data a first location on the key of the virtual keyboard, the first location indicating where the key was touched on the virtual keyboard when the data was received, the first location comprising one of the following: a top left quadrant of the key, a top right quadrant of the key, a bottom left quadrant of the key, or a bottom right quadrant of the key;

determine, based on the first location and a signature associated with a user profile, whether an identity of a user inputting the received data corresponds to the user profile, wherein the signature is calculated based on a second location of the key on the virtual keyboard determined from training data received at the device, the second location indicating where the key was touched on the virtual keyboard when the training data was received, the second location comprising one of the following: the top left quadrant of the key, the top right quadrant of the key, the bottom left quadrant of the key, or the bottom right quadrant of the key, the training data received in a sample of text to obtain biometric data relating to how the user types on the virtual keyboard;

modify said security policy on said device, based on said determining of whether the identity of the user inputting the received data corresponds to the user profile, by selecting said security policy from a plurality of different levels of access to said device, each of said plurality of different levels of access associated with a respective conditions of whether unauthorized use has occurred at said device by selecting said security policy from a plurality of different levels of access to said device, each of said plurality of different levels of access associated with a respective conditions of whether unauthorized use has occurred at said device; and, repeat, after every N number of touches at the virtual keyboard, where N is based on a level of access to said device as defined in said security policy, the determining from said received data the first location on the key, and the determining whether the identity of the user inputting the received data corresponds to the user profile, such that a likelihood that an authorized user is or is not the user accessing the device is repeated after every of the N number of touches, said security policy again modified when the identity of the user inputting the received data no longer matches the user profile.

7. A method of modifying a security policy of a device, the method comprising:
receiving data corresponding to use of said device, wherein said data corresponding to use of said device comprises data corresponding to use of a touchscreen; wherein said data corresponding to use of said touchscreen comprises data corresponding to use of key of a virtual keyboard displayed on said touchscreen; wherein said use of the key of the virtual keyboard displayed on said touchscreen comprises interacting with said touchscreen at a plurality of areas on said touchscreen; and wherein said data corresponding to use of said touchscreen further comprises data corresponding to said plurality of areas on said touchscreen; received data including a set of data points indicating where on the key of the virtual keyboard a touch was registered when the key was actuated, at least a subset of the data points representing a single touch;
determining a level of certainty that an identity of a user inputting the received data corresponds to a user profile, the level of certainty being based on at least one feature determined from said received data, wherein the at least one feature corresponds to a behavioural characteristic associated with how the received data was inputted into the device, the behavioral characteristic comprising where the key was touched when sample text was received to obtain biometric data relating to how the user types on the virtual keyboard;

modifying said security policy on said device to correlate to said level of certainty, by selecting said security policy from a plurality of different levels of access to said device, each of said plurality of different levels of access associated with a respective conditions of whether unauthorized use has occurred at said device;

receiving further data corresponding to further use of said device;

determining, based on said further data, an increased or decreased level of certainty that the identity of the user corresponds to the user profile;

modifying said security policy on said device to correlate to the increased or decreased level of certainty; and, repeating, after every N number of touches at the virtual keyboard, where N is based on a level of access to said device as defined in said security policy, the determining the increased or decreased level of certainty that the identity of the user corresponds to the user profile, said security policy again modified when the level of certainty changes.

8. The method of claim 7 wherein said data corresponding to use of said device further comprises data selected from the group consisting of: (a) data corresponding to use of applications accessible through said device; (b) data corresponding to use of application features accessible through said device; (c) data corresponding to use of a physical keyboard; (d) data corresponding to selection among a plurality of options; (e) data corresponding to use of phone numbers; (f) data corresponding to access of websites; (g) data corresponding to writing style; and (h) data corresponding to typographical errors.

9. The method of claim 7 wherein said device further comprises a connection to a partition, and wherein at least one of said modifying said security policy on said device to correlate to said level of certainty or said modifying said security policy on said device to correlate to said increased or decreased level of certainty comprises restricting access to said partition through said connection.

10. The method of claim 9 wherein said partition further comprises at least one application, and wherein restricting access to said partition through said connection comprises restricting access to said at least one application.

11. The method of claim 7, wherein
at least one of said determining the level of certainty that the identity of the user inputting the received data corresponds to the user profile or said determining the increased or decreased level of certainty that the identity of the user corresponds to the user profile is based on a signature,
and wherein the signature is calculated based on at least one other feature determined from training data received at the device, the at least one other feature corresponding to the behavioural characteristic associated with how the training data was received at the device.

12. The method of claim 7 wherein said receiving data corresponding to use of said device comprises receiving data corresponding to a first type of use of said device; and wherein said receiving further data corresponding to further use of said device comprises receiving further data corresponding to said first type of use of said device.

13. The method of claim 7 wherein said receiving data corresponding to use of said device comprises receiving data corresponding to a first type of use of said device; and wherein said receiving further data corresponding to further use of said device comprises receiving further data corresponding to a second type of use of said device.

14. A device having a security policy, the device comprising a computer readable memory storing computer executable instructions thereon that when executed, cause the device to:
receive data corresponding to use of said device, wherein said data corresponding to use of said device comprises data corresponding to use of a touchscreen; wherein said data corresponding to use of said touchscreen comprises data corresponding to use of key of a virtual keyboard displayed on said touchscreen; wherein said use of the key of the virtual keyboard displayed on said touchscreen comprises interacting with said touchscreen at a plurality of areas on said touchscreen; and wherein said data corresponding to use of said touchscreen further comprises data corresponding to said plurality of areas on said touchscreen; received data including a set of data points indicating where on the key of the virtual keyboard a touch was registered when the key was actuated, at least a subset of the data points representing a single touch;

determine a level of certainty that an identity of a user inputting the received data corresponds to a user profile, the level of certainty being based on at least one feature determined from said received data, wherein the at least one feature corresponds to a behavioural characteristic associated with how the received data was inputted into the device, the behavioral characteristic comprising where the key was touched when sample text was received to obtain biometric data relating to how the user types on the virtual keyboard;

modify said security policy on said device to correlate to said level of certainty, by selecting said security policy from a plurality of different levels of access to said device, each of said plurality of different levels of access associated with a respective conditions of whether unauthorized use has occurred at said device;

receive further data corresponding to further use of said device;

determine, based on said further data, an increased or decreased level of certainty that the identity of the user corresponds to the user profile;

modify said security policy on said device to correlate to the increased or decreased level of certainty; and, repeat, after every N number of touches at the virtual keyboard, where N is based on a level of access to said device as defined in said security policy, the determining the increased or decreased level of certainty that the identity of the user corresponds to the user profile, said security policy again modified when the level of certainty changes.

\* \* \* \* \*